United States Patent
Vik et al.

(10) Patent No.: US 11,939,249 B2
(45) Date of Patent: Mar. 26, 2024

(54) MICROWAVE ASSISTED PYROLYSIS AND GASIFICATION

(71) Applicant: Prototech AS, Bergen (NO)

(72) Inventors: Arild Vik, Blomsterdalen (NO); Crina Silvia Ilea, Nesttun (NO)

(73) Assignee: Prototech AS, Bergen (NO)

( * ) Notice: Subject to any disclaimer, the term of this patent is extended or adjusted under 35 U.S.C. 154(b) by 426 days.

(21) Appl. No.: 17/261,620

(22) PCT Filed: Jul. 19, 2019

(86) PCT No.: PCT/NO2019/050154
§ 371 (c)(1),
(2) Date: Jan. 20, 2021

(87) PCT Pub. No.: WO2020/017979
PCT Pub. Date: Jan. 23, 2020

(65) Prior Publication Data
US 2021/0261453 A1 Aug. 26, 2021

(30) Foreign Application Priority Data
Jul. 20, 2018 (NO) .................................. 20181008

(51) Int. Cl.
C02F 11/10 (2006.01)
C02F 9/00 (2023.01)
(Continued)

(52) U.S. Cl.
CPC ............... *C02F 11/10* (2013.01); *C02F 9/00* (2013.01); *C10J 3/06* (2013.01); *F23G 5/027* (2013.01); *H01M 8/0618* (2013.01); *C02F 11/04* (2013.01); *C02F 11/12* (2013.01); *C02F 11/13* (2019.01); *C02F 11/18* (2013.01);
(Continued)

(58) Field of Classification Search
CPC C02F 11/10; C02F 11/13; C02F 11/04; C02F 11/12; C02F 11/18; C10J 3/06; C10J 2300/0923; C10J 2300/123; C10J 2300/1646; H01M 8/0618; H01M 2008/1293; C01F 2103/20
See application file for complete search history.

(56) References Cited

U.S. PATENT DOCUMENTS 4,592,291 A * 6/1986 Sullivan, III ........... C02F 1/302
110/238
6,398,921 B1 6/2002 Moraski
(Continued)

FOREIGN PATENT DOCUMENTS

CN 101724467 A 6/2010
CN 102718383 A 10/2012
(Continued)

OTHER PUBLICATIONS

Machine Translation of CN-106675661-A (Apr. 19, 2023) (Year: 2023).*
(Continued)

*Primary Examiner* — Matthew J Merkling
(74) *Attorney, Agent, or Firm* — Alix, Yale & Ristas, LLP

(57) ABSTRACT

A method and system for converting an aqueous salt containing sludge into gases and a solid residue is described. The sludge is pyrolyzed and gasified with the assistance of microwave radiation.

16 Claims, 10 Drawing Sheets

(51) Int. Cl.
*C02F 11/04* (2006.01)
*C02F 11/12* (2019.01)
*C02F 11/13* (2019.01)
*C02F 11/18* (2006.01)
*C02F 103/20* (2006.01)
*C10J 3/06* (2006.01)
*F23G 5/027* (2006.01)
*H01M 8/0612* (2016.01)
*H01M 8/12* (2016.01)

(52) U.S. Cl.
CPC ... *C02F 2103/20* (2013.01); *C10J 2300/0923* (2013.01); *C10J 2300/123* (2013.01); *C10J 2300/1646* (2013.01); *F23G 2200/00* (2013.01); *F23G 2201/30* (2013.01); *F23G 2209/12* (2013.01); *H01M 2008/1293* (2013.01)

(56) References Cited

U.S. PATENT DOCUMENTS

| | | | |
|---|---|---|---|
| 9,487,708 | B2 | 11/2016 | Doucet et al. |
| 2007/0144060 | A1* | 6/2007 | Ikura ............... C11C 3/00 44/308 |
| 2013/0081934 | A1 | 4/2013 | New |
| 2015/0030944 | A1* | 1/2015 | Yun ............... H01M 8/0675 429/502 |
| 2018/0057753 | A1* | 3/2018 | Heiskanen ............... C10G 9/32 |
| 2021/0261453 | A1* | 8/2021 | Vik ............... F23G 5/027 |

FOREIGN PATENT DOCUMENTS

| | | | |
|---|---|---|---|
| CN | 103058481 | A | 4/2013 |
| CN | 104355519 | A | 2/2015 |
| CN | 105417918 | A | 3/2016 |
| CN | 106675661 | A * | 5/2017 |
| GB | 2287471 | A | 9/1995 |

OTHER PUBLICATIONS

Examination Report dated Sep. 1, 2021 for Norwegian Patent Application No. 20181008.
Chinese Office Action dated Jul. 5, 2022 for Chinese Patent Application No. 201980048415.7 with English translation.
International Search Report and Written Opinion dated Oct. 16, 2019 for International Patent Application No. PCT/NO2019/050154.
International Preliminary Report on Patentability dated Oct. 30, 2020 for International Patent Application No. PCT/NO2019/050154.
Norwegian Search Report dated Apr. 2, 2019 for Norwegian Patent Application No. 20181008.
Chungen, Yin, "Microwave-assisted pyrolysis of biomass for liquid biofuels production," Bioresource Technology, vol. 120, pp. 273-284, Jun. 16, 2012.
Ilea, Crina S., "Energy System with Biogas and Hydrogen for Fish Farms," Gasskonferansen, Trondheim, Apr. 10-11, 2018.
Menendez, J.A. et al., "Microwave-induced drying, pyrolysis and gasification (MWDPG) of sewage sludge: Vitrification of the solid residue," Journal of Analytical and Applied Pyrolysis, vol. 74, pp. 406-412, Aug. 2005, Abstract.
Motasemi, F. et al., "A review on the microwave-assisted pyrolysis technique," Renewable and Sustainable Energy Reviews, Elsevier, vol. 28(C), pp. 317-330, 2013, Abstract.
Aimin, Ji, "Transformation Mechanism of Municipal Sludge Pyrolysis and Economic Evaluation," Metallurgical Industry Press, 1st ed., p. 60-61, Aug. 31, 2016 (with English translation).
Third Office Action dated Jun. 1, 2023 for Chinese Patent Application No. 201980048415.7 (with English translation).

* cited by examiner

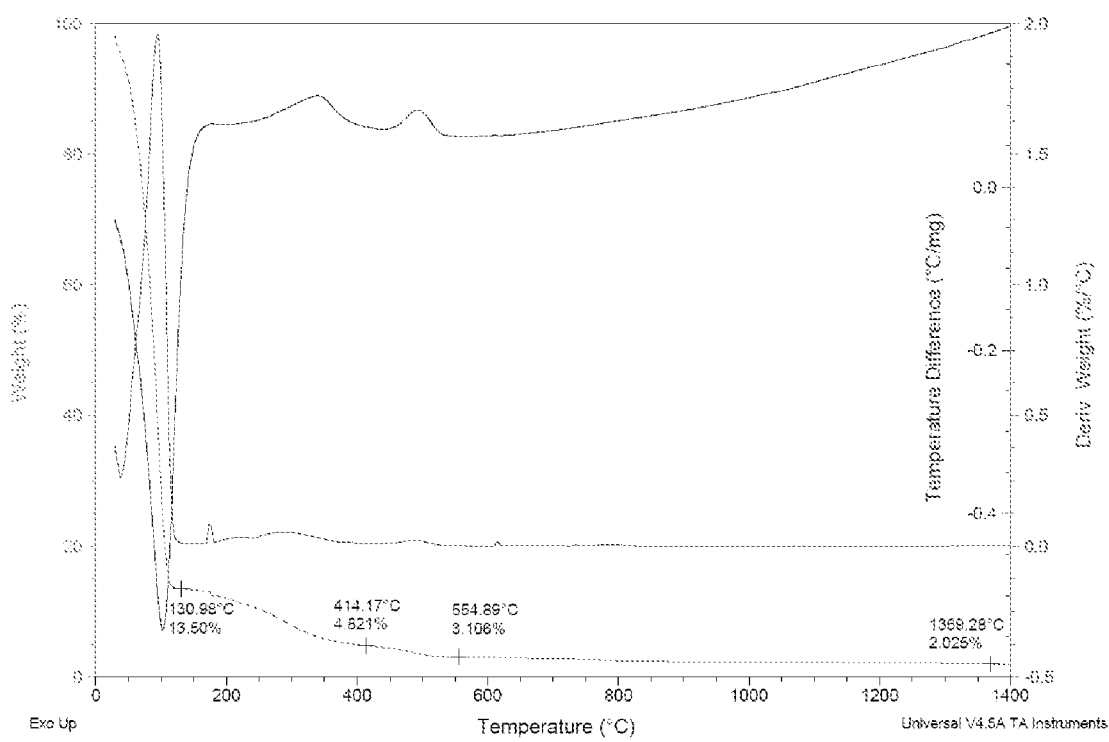
Figure 2A. TG/DTA analyses - in air
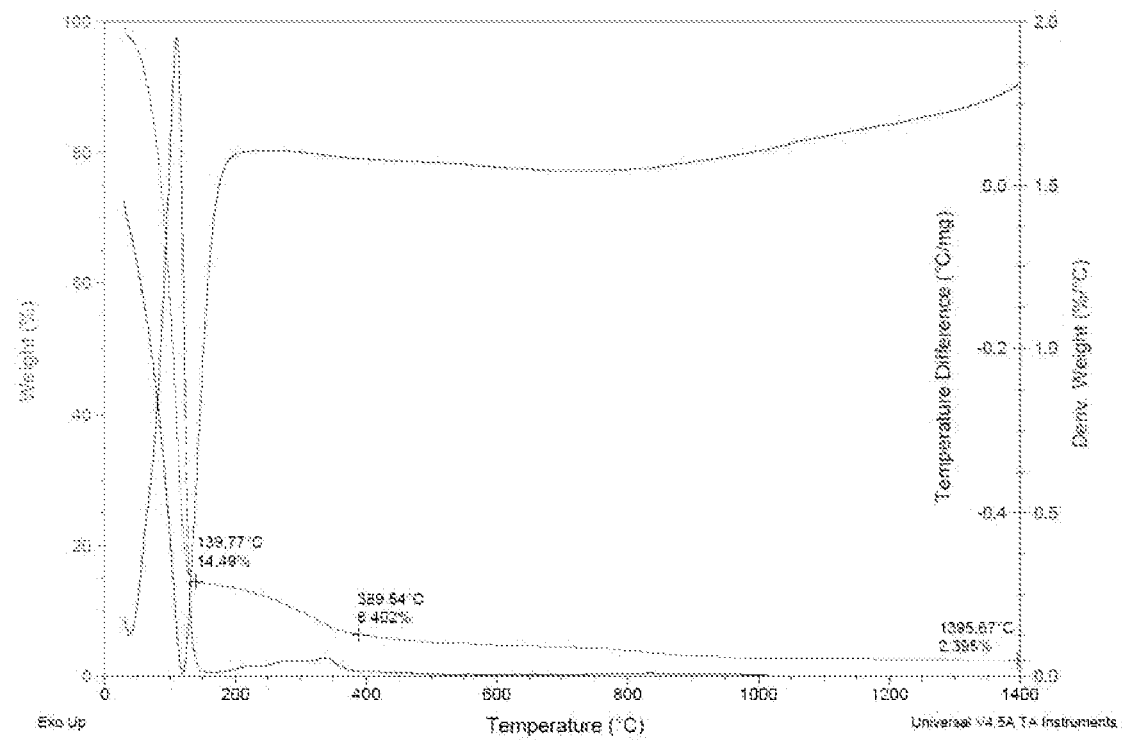
Figure 2B. TG/DTA analyses – in argon

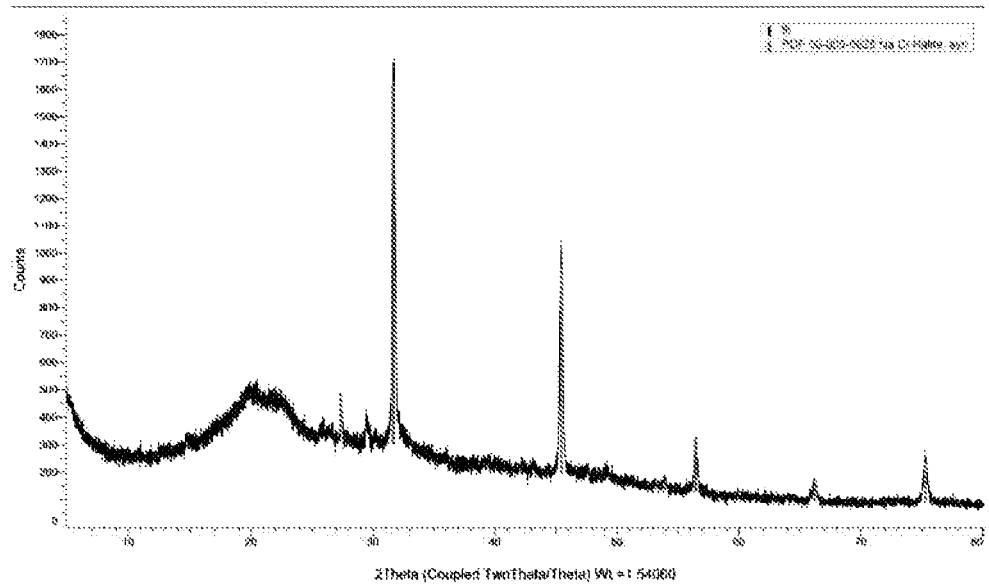
Figure 3A. RD spectra: raw fish sludge
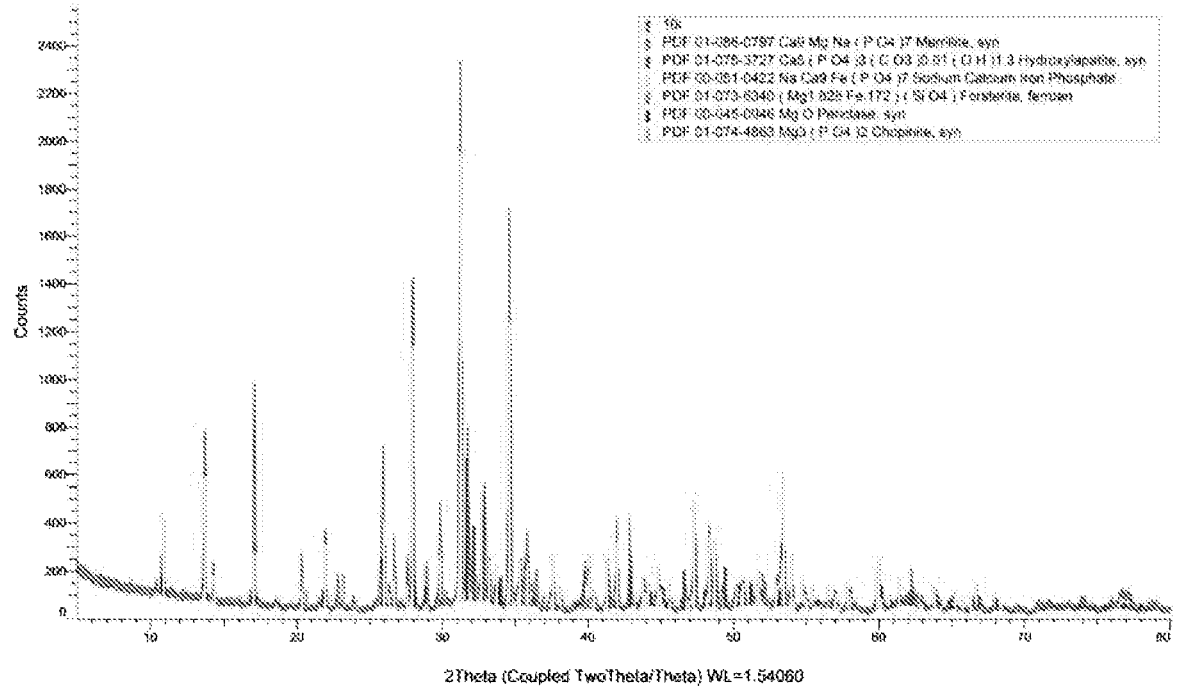
Figure 3B. RD spectra: fish sludge treated at 1200°C

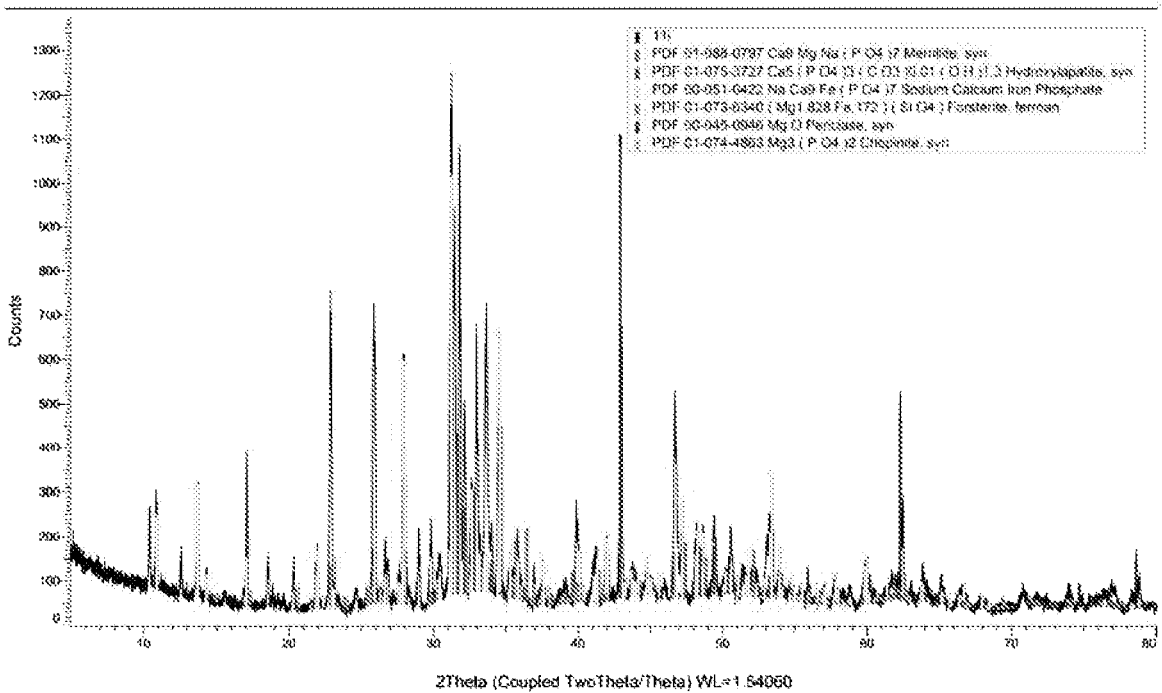
Figure 3C. XRD spectra: fish sludge treated at 1300°C

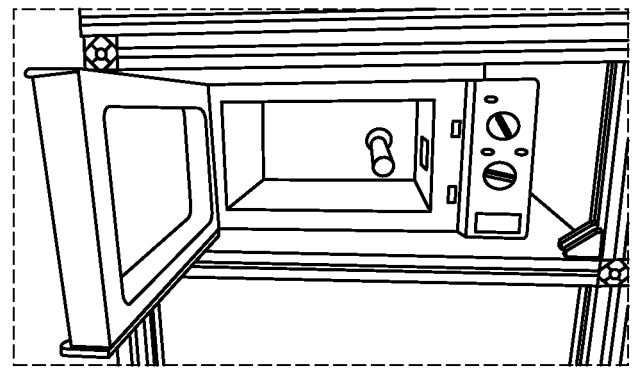
Figure 4A. Proof of concept MAP-G reactor
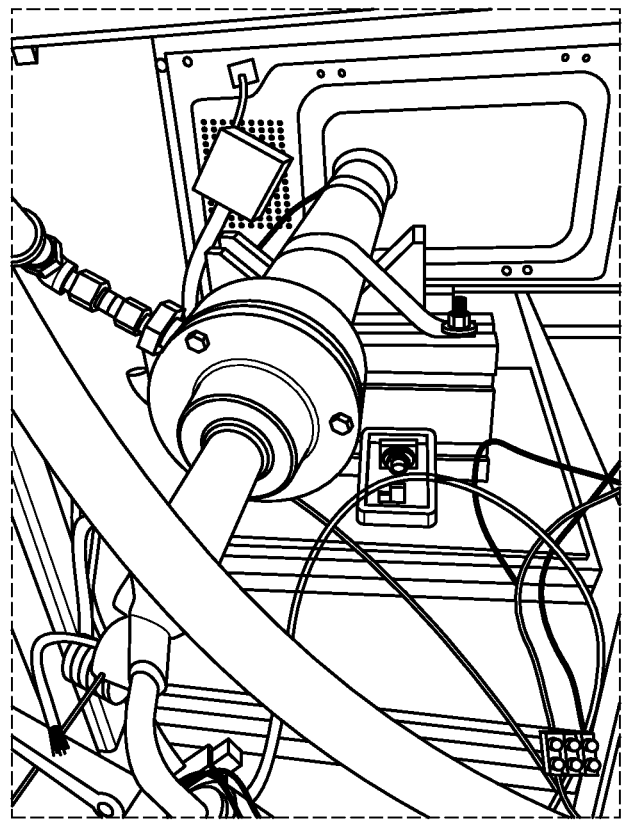
Figure 4B. Proof of concept MAP-G reactor
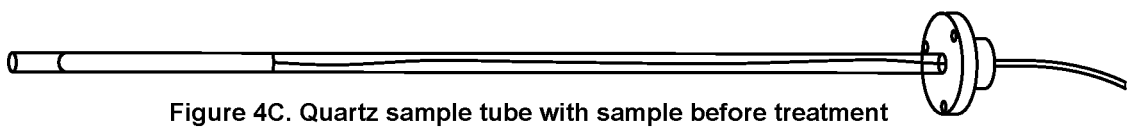
Figure 4C. Quartz sample tube with sample before treatment Figure 5. P&ID of the test set-up Figure 6. Fish sludge sample after MW pyrolysis/gasification, and after removal from the quartz tube Figure 7. Temperature measured inside the sample during the pyrolysis/gasification test on 16.03.2018

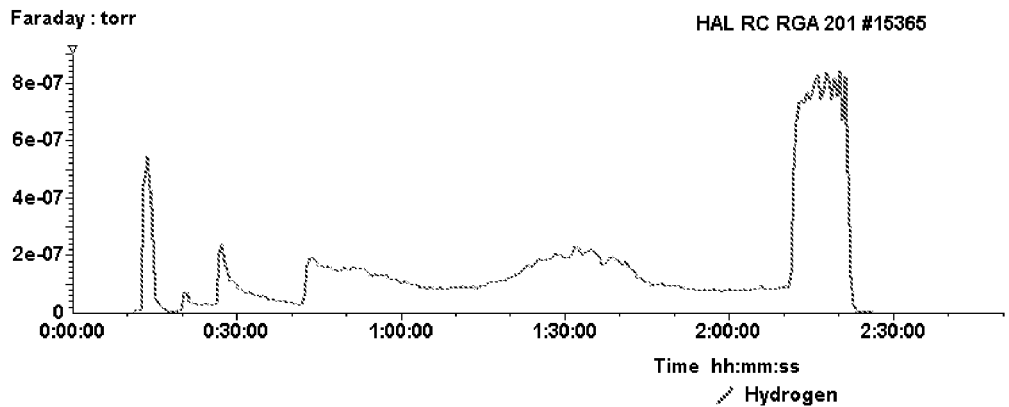
Figure 8A. Gases production during the pyrolysis/gasification test on 16.03.2018
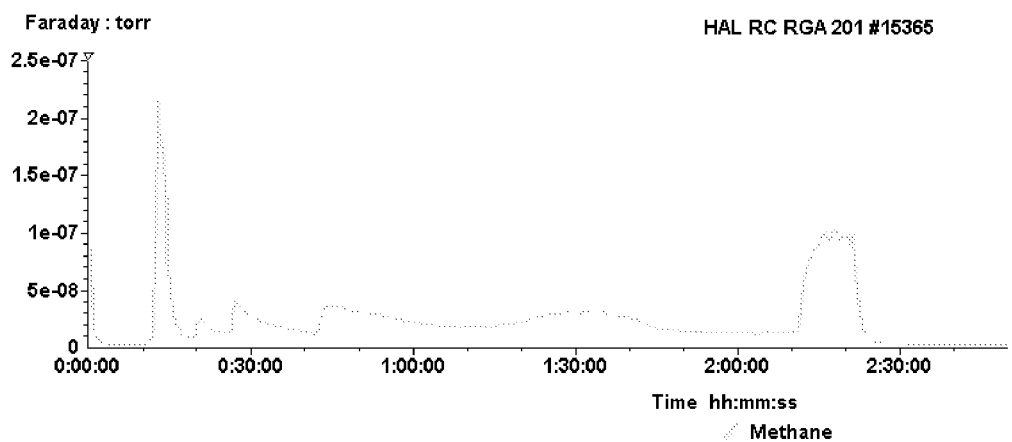
Figure 8B. Gases production during the pyrolysis/gasification test on 16.03.2018
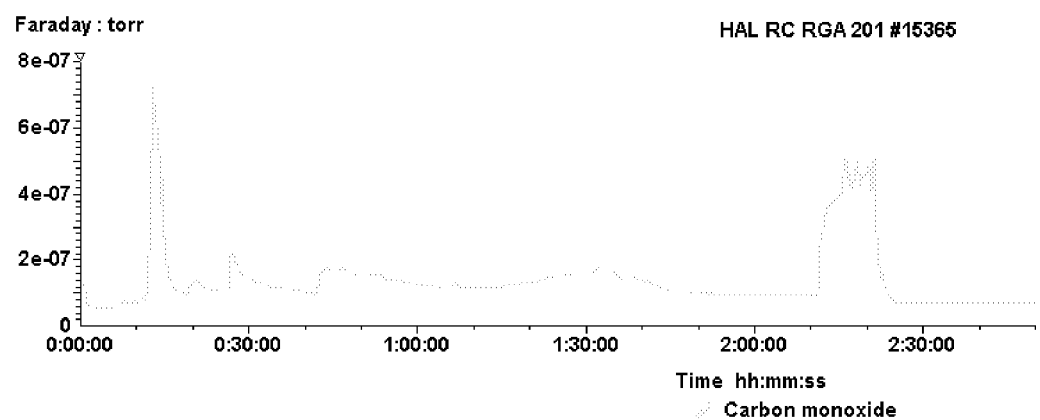
Figure 8C. Gases production during the pyrolysis/gasification test on 16.03.2018

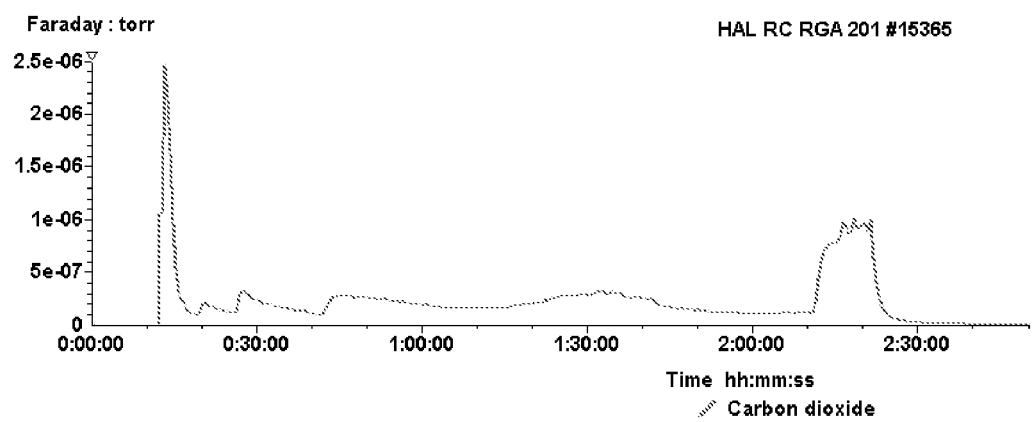
Figure 8D. Gases production during the pyrolysis/gasification test on 16.03.2018

MICROWAVE ASSISTED PYROLYSIS AND GASIFICATION

BACKGROUND

The disclosed embodiments relate to a method and system for converting an aqueous salt containing sludge.

Aquaculture industry is in a continuous growth with huge economic benefits. Currently the fish can be raised until harvested in different types of cage farms e.g. open cages placed directly in the water or "off-shore cultivation" when the cages are placed directly in the sea water. Another alternative is represented recirculating aquaculture systems (RAS) which comprise a series of culture tanks and where the water is continuously recirculated and monitored. Thus, the fish farms can be located in different areas on land or on the sea, sometimes isolated and off-grid connections.

The fish farming industry also face different challenges such as escaped fish/genetic interaction, pollution and discharges, diseases and parasites, use of coastal areas, feed/feed resources. Thus, lately, different closed cage farms concepts have been developed with many positive benefits such us preventing escaping of the fish, avoiding the fish lice problems, less medicines and antibiotics, but also that the fish sludge will no longer reach the bottom of the sea. Closing the fish farm cages represents a good environmental measure but it will also bring new challenges that must be solved e.g. huge quantities of sludge that will be collected from the bottom of the closed fish farms, pumped and transported on land. This sludge possesses a tremendous potential to generate energy but it is also a valuable source of nitrogen (N), phosphorous (P), heavy metals (Cd, Pb, Hg, Ni, Zn, Cu, Cr), salt (NaCl), other minerals which were so far not exploited/recovered. Another challenge for a closed cage fish farm is that you have to provide large quantities of oxygen to the fish in order to maintain the fish health and welfare. This comes with a significant cost in case the oxygen is purchased from different commercial producers.

For example, if the fish farming industry will manage to collect and re-use all the sludge from 1 million tones salmon/year to produce biogas, then 70-190 million m$^3$ methane could be produced, equivalent to 0.7-2 TWh energy. As a comparison, according with the Statistics Norway, in 2009 Bergen area having a population of 252 051 inhabitants, used in total 2.0334 TWh energy. According to Fishery Directorate, in March 2018 the total fish production in Norway was 728 531 tons from which 103 788 tons are located in Hordaland area. According to Milostatus 780 tons fish will generate as much waste in form of sludge as 11 780 inhabitants. Thus, the total fish production in Norway can generate waste in form of sludge as 13-14 million inhabitants (approx. 3 times the population of Norway); but, if collected and re-used it can generate up to 6.7 million Nm$^3$ methane or 65 GWh/year. The aquaculture industry aims to increase their production by a factor of 5, until 2050 leading to a potential methane production of 580 million Nm$^3$ or 5.7 TWh/year.

Different solutions for sludge handling that have been proposed so far are aiming to filter, dewater and/or dry the sludge up to 95-98% total solids. Either afterwards the dried pellets are delivered to a waste recovery plant (e.g. Denmark, Sweden) to produce biogas or to different production lines to be used as "green fuel" e.g. cement. One cement factory has a capacity of burning up to 12 000 tons dried sludge (Fiskeslam som brensel—Tom Berntsen, HeidelbergCement http://tekset.no/wp-content/uploads/2017/02/14-Berntsen.pdf). Anyhow, these solutions come with a significant transport cost and environmental consequences. Besides, by incinerating and/or burning the dried sludge pellets all the valuable components still present are wasted.

Another waste recovery technology used at large scale to produce biogas and fertilizer is anaerobic digestion. The number of anaerobic digester recovery plants is still increasing buy they are mainly using mixt waste from sewage, wood, plants, etc. When it comes to the fish sludge the anaerobic digestion technology could be used only for the sludge generated by on-land fish farms, so-called fresh water fish sludge. The challenges here are that in an anaerobic digester plant the biogas production is quite slow (require up to 20-30 days to produce the biogas), the plants are quite expensive and require large area of land around the needed units e.g. digesters, reservoirs, collectors. Thus, new technologies for handling this large volume of generated waste are required.

When it comes to the sludge generated by a sea-based fish farm or RAS, which are using a mixture of fresh water with seawater, there is salt present in the sludge. This salt destroys the media/bacteria inside the anaerobic digester unit. Therefore, for this specific type of sludge the anaerobic digestion technology can be used only if the sludge is desalinated (by using large amounts of fresh water), dewatered and/or dried (by using large amounts of energy). Depending on the digester manufacturers the salt level needs to be reduced to 1% (ENSPAR Biogas, www.enspar.de) and 25% (Schmack Biogas, www.schmack-biogas.com).

U.S. Pat. No. 6,398,921 describes a process for gasifying solid organic matter from wastewater sludge involves dewatering the sludge to a solids content of at least 35% by weight using a combination of centrifugation, microwave heat exchange and screw press separation. The denatured solids are than at least partially pyrolyzed by passing through a heated inclined screw auger. The pyrolysis solids, tars and gases are then gasified by exposure to a high intensity microwave field. The method cannot be used if the sludge contains salt.

SUMMARY

The disclosure provides a method and system that can treat salt containing sludge. The method and system are realized in compact and fast process, wherein the composition of the products can be controlled by the reaction temperature and the reaction kinetics by control of the microwave intensity. The method and system can also be used for treatment of sludge that has a low, or no amount of salt.

In one embodiment, a method for continuous large scale converting an aqueous salt containing sludge into gases and a solid residue comprises;
- the aqueous salt containing sludge is dewatered to a water content of 20-60% (weight/weight); and thereafter;
- the dewatered sludge is heated to a temperature of 500° C. to 1000° C. by microwave radiation, wherein the microwave radiation generates heat and steam,
- partially or complete pyrolyzing the dewatered sludge to produce pyrolysis products, wherein the pyrolysis products inter alia are CO (g), CH$_4$ (g) and H$_2$ (g), CHO (oil) and C(s)
- gasifying the pyrolysis products, wherein inter alia the C (s), H$_2$ (g) and CHO (oil) is gasified to CO (g) and H$_2$ (g), wherein the pyrolysis and gasification takes place simultaneously in one reactor.

In a preferred embodiment the dewatered sludge is anoxically exposed to a temperature in the range of 500° C. to 700° C.

In a preferred embodiment the dewatered sludge is anoxically exposed to a temperature in the range of 500° C. to 600° C.

In a preferred embodiment the dewatered sludge is anoxically exposed to a temperature in the range of 600° C. to 700° C.

In a preferred embodiment the anoxically exposure in the reaction is obtained by adding an inert gas to the reactor.

In a preferred embodiment a reaction temperature of 500° C. to 700° C. is maintained without external cooling of the reactor.

In a preferred embodiment a reaction temperature of 500° C. to 600° C. is maintained without external cooling of the reactor.

In a preferred embodiment a reaction temperature of 600° C. to 700° C. is maintained without external cooling of the reactor.

In a preferred embodiment the pyrolysis products, inter alia C (s), $H_2$ (g) and CHO (oil) are completely gasified to CO (g) and $H_2$ (g).

In a preferred embodiment the microwave radiation the steam for the gasification reaction is generated by heating the water in the salt containing aqueous sludge.

In a preferred embodiment a microwave radiation absorber (catalyst) is used to absorb microwave radiation.

In a preferred embodiment the microwave radiation absorber is produced during the pyrolysis of the sludge.

In a preferred embodiment carbon the microwave radiation absorber is produced during the pyrolysis of the sludge.

In a preferred embodiment the aqueous salt containing sludge is dewatered to a water content of 30-40% (weight/weight).

In a preferred embodiment the method steps are conducted in a one-step reactor.

In a preferred embodiment the salt containing dewatered sludge is fed to the reactor (100), and wherein a microwave radiation having a field density of 0.5-5 kW/l, more preferably 0.8-2 kW/l, and most preferably about 1 kW/l is applied to the sludge, and wherein the dewatered sludge is anoxically exposed to a temperature in the range of 500° C. to 600° C., in order to partially or completely pyrolyse and gasify the sludge to gases and char.

In a preferred embodiment the gasses and char are separated and collected.

In a preferred embodiment the salt containing aqueous sludge is added to the reactor, and the gas and char are collected from the reactor continuously.

In a preferred embodiment the gasifying is carried out in the absence of oxygen.

In a preferred embodiment the salt containing aqueous sludge is from a fish farm.

In a preferred embodiment the salt containing aqueous sludge is from a RAS fish farm.

In a preferred embodiment the salt containing aqueous sludge is from a marine fish farm.

In a preferred embodiment the salt containing aqueous sludge salt is contained in a concentration of 10-100 g/kg, more preferably 15-50 g/kg, and more preferably 20-40 g/kg, and most preferably 30-40 g/kg.

In a preferred embodiment the salt containing aqueous sludge salt is contained in a concentration of 31 g/kg, to 38 g/kg.

In a preferred embodiment the salt containing aqueous sludge $Na^+$ is contained in a concentration of 10-200 g/kg, more preferably 20-100 g/kg, and more preferably 30-60 g/kg.

In a preferred embodiment the salt containing aqueous sludge $Cl^-$ is contained in a concentration of 50-300 mg/g, more preferably 75-200 mg/g, and more preferably 90-150 mg/g.

In a preferred embodiment the dewatered sludge is heated to 500° C. to 600° C. by microwave radiation.

In a preferred embodiment the temperature of heating of the dewatered sludge is regulated to a lower temperature in order to enhance the fraction of methane in the produced gas mixture.

In a preferred embodiment the reactor increases temperature through the reactor, in order to produce gas with a low vapour pressure of salt at low temperatures and the rest at higher temperature, at low gas volume, to obtain complete conversion.

In a preferred embodiment steam in the first part of the reactor can bypass the pyrolysis zone and be directed to the gasification zone in order to control the reaction products.

In a preferred embodiment the produced gas can be further heated from the reaction zone to the absorbent in order to avoid uncontrolled condensation.

A second aspect of the disclosed embodiments relate to a system for use in gasifying of a salt containing aqueous sludge, comprising a reactor (100) comprising;
  a microwave generator that generates microwaves have a field strength of 0.5-5 kW/l, more preferably 0.8-2 kW/l, and most preferably about 1 kW/l, and applies the microwave radiation to the sludge added to the reactor (100), and
  a pyrolysis unit to pyrolyze anaerobically the sludge, and
  a gasification unit which gasifies the pyrolysis products.

In a preferred embodiment the system also comprises a dewatering unit, upstream for the reactor (110).

In a preferred embodiment the system comprises a gas/solid separator.

In a preferred embodiment the system comprises a gas cleaning unit downstream for the reactor capable of cleaning the wet gas received from the reactor.

In a preferred embodiment the system comprises a fuel cell which converts that gas produced by the reactor into heat, $CO_2$ and water.

In a preferred embodiment the fuel cell is a SOFC.

In a preferred embodiment the heat generated by the fuel cell is fed to the drying unit.

BRIEF DESCRIPTION OF THE DRAWINGS

Embodiments of the present invention will now be described, by way of example only, with reference to the following diagrams wherein:

FIGS. 2A and 2B show TG/DTA analyses of a sludge sample.

FIGS. 3A 3B, and 3C show XRD spectra: with upper graph FIG. 3A—raw fish sludge; middle graph FIG. 3B—fish sludge treated at 1200° C.; lower graph FIG.3C—fish sludge treated at 1300° C.

FIGS. 4A, 4B and 4C shows a proof of concept MAP-G reactor (two upper pictures—FIGS. 4A and 4B); quarts sample tube with sample before treatment (lower picture—FIG. 4C).

FIGS. 8A, 8B, 8C and 8D show the production of gases during the pyrolysis/gasification test on Mar. 16, 2018.

DETAILED DESCRIPTION

Figure 1:
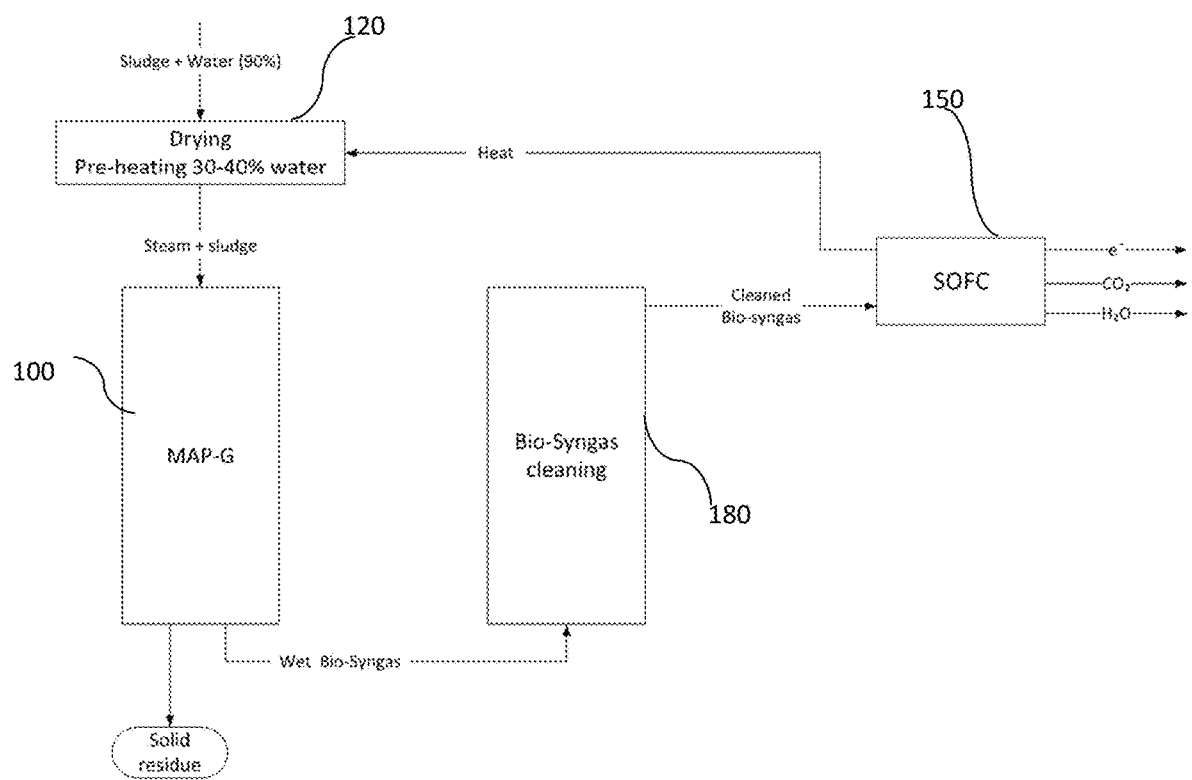
FIG. 1 shows a schematic diagram of the concept of microwave assisted pyrolysis and gasification (MAP-G) of an aqueous sludge.

We have shown that the salt containing sludge can be treated and converted to char and gases by a combination of pyrolysis and gasification, and wherein the pyrolysis and gasification reactions are assisted with microwave radiation. Microwave Assisted Pyrolysis and Gasification (MAP-G)

The sludge generated by a closed fish farm usually contains fish food waste, faeces, nutrients, water, and in the case of a sea-based fish farm, salt. The waste generated by the byproducts from hatcheries e.g. bones, skin, guts can be recycled and is in the context of the disclosure not considered here. However, also a sludge containing remainder of fish and fish byproducts can be treated by the disclosed method.

Pyrolysis represents a thermochemical decomposition of different organic material at elevated temperatures and in the absence of oxygen. During pyrolysis, the organic waste is decomposed into gas, tar and a char—reaction 1, see below. The pyrolysis is considered as an alternative to biogas production via anaerobic digester technology and provides fast pyrolysis that occurs during a short residence time.

Our preliminary calculations of a microwave assisted pyrolysis and gasification (MAP-G) technology shows that this method will provide 2 to 3 times more energy than the alternative anaerobic digester route.

Gasification is an endothermic process which means heat is required. The tars (gas+oil fractions) are usually collected and burned as fuel to produce energy. The generated heat is converted into electricity in a turbine or any other thermal engine.

The proposed alternative for the produced tars uses the already produced hydrogen (in the pyrolysis reaction) and steam to enhance the bio-gas production—reaction 2; while the solid bio char will also be further gasified using steam into bio-gas—reaction 3.

The reactions present during the pyrolysis and gasification processes are as follows:

Reaction 1 – Pyrolysis reaction

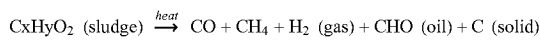
$C_xH_yO_2$ (sludge) $\xrightarrow{heat}$ CO + CH$_4$ + H$_2$ (gas) + CHO (oil) + C (solid)

Reaction 2—Gasification Reaction

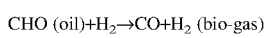
CHO (oil)+H$_2$→CO+H$_2$ (bio-gas)

Reaction 3—Gasification Reaction

C (solid)+H$_2$O (steam)→CO+H$_2$ (gas)+solid residue

Total Reaction

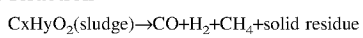
$C_xH_yO_2$(sludge)→CO+H$_2$+CH$_4$+solid residue

We will use microwave energy as the energy source for the pyrolysis and gasification processes because of very fast heat delivery. A few seconds are needed to reach 1000° C.

It is known to use carbon as catalyst to absorb the microwave radiation. The technology so far is that you have to add active carbon and mix it with the waste that you are going to thermally decompose in the pyrolysis step.

In the method according to the disclosure, we will not add carbon, but the carbon that will be produced during the pyrolysis will start to absorb the microwave radiation immediately and continuing to heat itself and the surrounding and thus, sustaining the gasification processes. Therefore, at the beginning of the process the remained water will absorb the microwave radiation generating steam and initiating the pyrolysis reactions producing the solid Carbon and gas via pyrolysis reactions. The produced solid Carbon via pyrolysis is highly reactive and it will take over; it will continue to absorb the microwave radiation, and thus continuing to heat itself and the produced oils until all the gasification reactions are completed (very fast). The absorption of microwave radiation by the water and Carbon will happen simultaneously and continuously since the reactor will be continuously fed with fish sludge: new water entering the reactor at all time, new steam, new carbon, new oils, and new gas. All these reactions and effects are connected to each other and take place in circle.

Simplified mechanism is as follows:

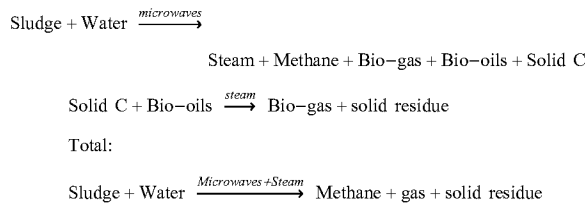

Sludge + Water $\xrightarrow{microwaves}$ Steam + Methane + Bio-gas + Bio-oils + Solid C Solid C + Bio-oils $\xrightarrow{steam}$ Bio-gas + solid residue Total:

Sludge + Water $\xrightarrow{Microwaves + Steam}$ Methane + gas + solid residue

Advantages: the solid carbon obtained via pyrolysis is highly active but only for a short period. The proposed solution will not involve any additional transportation of the produced carbon. Instead, it will be used immediately in the same reactor, i.e. a one-step reactor for pyrolysis and gasification.

Microwaves enhance the reaction kinetics resulting in faster conversion at lower temperatures, so called microwave assisted reaction kinetics enhancement. This means that for a practical, compact and fast application the process can operate at a lower temperature than for pure thermal heating for pyrolysis.

If the reactions are performed at high temperatures salt will evaporate in the reactor and condensate when the reaction gas is cooled. In a reactor producing 100 kWth operated at 600 C, appr. 1 kg of salt will evaporate in one year. This small amount of salt can easily be condensed out in an absorbent, adsorbent or condensation chamber. The condensed salt can be washed out periodically by cooling to ambient temperature and flushing with water. When operated at 700 C, 800c or 900 C the amounts of salt will be appr. 30 kg, 350 kg and 2200 kg respectively. These amounts of salt would require larger operating costs and larger equipment.

The fuel in the produced gas consist mainly of methane, hydrogen and carbon monoxide. A higher fraction of methane is formed at lower temperatures. Methane has a higher volumetric energy content than hydrogen and carbon monoxide. The smaller volume means that less salt will be evaporated and transported, and less energy and volume is needed for compression and storage. Less energy is required to produce methane than hydrogen and carbon monoxide, and the efficiency is higher when used in a fuel cell. As the use of microwave assisted reaction kinetics enhancement enables the reactions to take place at sufficiently high rates at lower temperatures, a more attractive gas composition can be obtained.

The process can also be run at increasing temperatures through the reactor, so that as much as possible of the gas is produced with a low vapour pressure of salt at low temperatures and the rest at higher temperatures, but low gas volume, to obtain complete conversion.

Steam generated in the first part of the reactor can bypass the pyrolysis zone and directed to the gasification zone in order to control the reaction products.

The gas can be further heated from the reaction zone to the absorbent to avoid uncontrolled condensation.

Methane and Gas as Fuel for Fuel Cells:

As described in FIG. 1, the disclosed method provides a one-step reactor to continuously thermally decompose and gasify the fish sludge into gas and char by using microwaves as heat source, so called microwave assisted pyrolysis and gasification (MAP-G) technology.

In accordance with the method, the solids contained by the fish sludge can be decomposed very fast (some seconds) through the one-step microwave assisted pyrolysis and gasification reactor (MAP-G) (100) into gas and solid residue while travelling along the reactor (100). The one-step reactor design can be vertical and thus the gravitational force will help with a constant feeding of the MAP-G reactor (100), and thus, no additional power will be needed for the feeding unit. The disclosed embodiments also anticipate other reactor designs, and the feedstock can be pumped into the reactor (100). The feedstock will preferably consist of small sludge agglomerates coming directly from the cyclone separator (not shown in FIG. 1) and being dried in a drying unit (120) to a 40-60% water content prior entering the MAP-G reactor (100).

The energy and heat required for the drying and pre-heating of the sludge can be provided by any means. However, the heat is preferably provided by the high temperature fuel cell unit (150). This heat (preferably up to 750° C.) can be recovered and reused to dry the fish sludge and also simultaneously form steam. The produced steam will be used for the gasification reactions and thus, the steam together with the sludge (40-60% water content) will enter the MAP-G reactor (100) where pyrolysis and steam gasification reaction will take place simultaneously to produce more steam, carbon and wet gas. Therefore, the pyrolysis MAP-G reactor (100) will further dry the sludge (40-60% water) to produce more steam while the pyrolysis reaction will also take place. The steam flow coming from the drying unit (120) and the steam produced inside the MAP-G reactor (100) will simultaneously gasify the pyrolysis products (char and the oils) into gas and solid residue. The aim is that all the produced carbon and all the produced oils will be gasified in one single reactor (100). Due to the continuous fed of the reactor (100) the produced gas will contain traces of water, so called wet gas. This wet gas will move to the exit part of the reactor (100) at the bottom of the reactor (100), due to an increase in the gas pressure, and it will be fed into a gas cleaning unit (180) and from here the dried and lean gas will be used as fuel into the fuel cell system (150). Into the cleaning unit (180), different commercial absorbers will be used to remove the traces that are present into the gas and that are harmful for the fuel cell system (e.g. water, Sulphur, siloxanes, salt). At the end, from the fuel cell system (150) water, $CO_2$ stream, electricity and heat will be produced and these products can be captured and reused in other processes on-site.

A main advantage of using water already present in the sludge as a steam source to gasify the solid char is that the sludge will not require a dewatering and/or drying step as in other available technologies. In prior art technologies must up to 95-98% of the water be removed before treatment. Instead, according to the disclosure, a water removal between 40 and 60% will be sufficient. The remaining water will provide the required amount of steam for the gasification of the char fraction. Thus, energy will be saved by not dewatering and drying the sludge. And in addition, no additional external water stream is required.

By combining the pyrolysis and gasification with the help of microwave at the end of the processes mainly bio-gas and small amounts of solid residue will be produced. The method provides for gasification of the produced solid carbon char as fast and as much as possible, until in the end the remaining solid residue will contain mainly phosphorus, heavy metals, nitrogen, salt and very little or no amount of char. If these valuable nutrients and components are volatilized and removed from the fish sludge inside the MAP-G reactor different commercial absorbents can be used to separate the removed nutrients and components from the flue gas (at different temperatures).

Thermogravimetric (TG/DTA) Measurements

Figure 5:
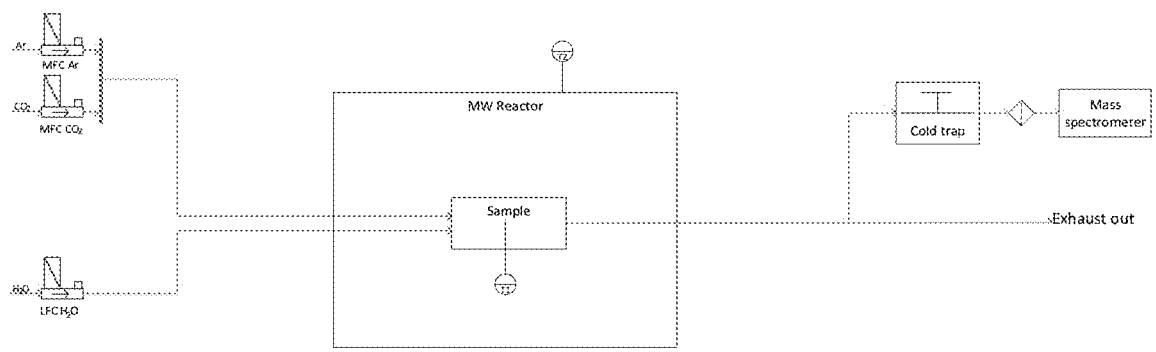
FIG. 5 shows P&ID of the test set-up.

TG/DTA analyses were performed both in air and in reduced atmosphere (using Argon gas) on a raw/fresh fish sludge generated by fish from a RAS unit. The tests of the fresh fish sludge samples (see FIG. 5) show the evolution of the sample mass while it was heated in air and reduced atmosphere, up to 1400° C. using a 5° C./min as heating rate. The results show that both samples are losing most of its mass to water evaporation up to 130° C. For the sample treated in air (FIG. 2A) the subsequent mass change takes place between 130 and 550° C. corresponding to oxidation of the organics present in the samples. The two peaks at around 300° C. and at around 460° C. occur during the oxidation, probably corresponding to oxidation of volatile organics and fixed carbon, respectively. After 550° C. no major effects are noticed and the remaining mass is mostly constant. The mass was reduced up to 98%.

For the sample treated in Argon FIG. 2B the subsequent mass change takes place between 140 and 400° C. corresponding to thermally decomposition of the organics present in the samples. The two peaks at around 300° C. and at around 460° C. corresponding to oxidation of volatile organics and fixed carbon are not present. After 400° C. no major effects are noticed and the remaining mass continuously decreasing due to the elimination of the gasses from the sample. The total mass reduction was up to 98%.

XRD Analyses

A raw/fresh fish sample of a fish sludge from a RAS unit was investigated using XRD. Besides, similar fish sludge samples were thermally treated in air, up to 1200° C. and 1300° C., respectively (using 200° C./h as heating rate and 2 h as plateau). The XRD spectra are shown in FIGS. 3A, 3B and 3C.

For the XRD spectra the sample of fresh fish sludge was dried at 104° C. for 12 h before using it in the XRD. The spectra of the raw/fresh fish sample, see FIGS. 4A, 4B, and 4C—up, shows only amorphous phase, no crystalline phases were identified, except NaCl (halite) which was present in the sludge from the sea water.

The XRD spectra of the fish sludge samples treated in air at 1200 and 1300° C., respectively show similar crystalline phases e.g. merillite, hydroxylapatite, sodium calcium iron phosphate, forsterite, periclasem chopinite. The crystalline phases that are present are combining relevant and useful elements such as Ca, Mg, Na, Fe, P which should be recover from the remaining residue.

Add the XRD data of the sample—after testing on 16 March-soon

Elemental Analysis

The samples used for the XRD were also used to determine the elements that are present in the samples. The XRD detection limit cannot identify the very low levels of all the elements present in the samples. The elemental analysis of the samples is given in table below in mg/kg.

TABLE 1

Elemental analysis of different fish sludge samples

| | mg/kg | | |
|---|---|---|---|
| | 9i | 10i | 11i |
| Li | 0.96 | 44.34 | 63.78 |
| Be | 0.02 | 0.09 | 0.06 |
| B | 45.57 | 99.51 | 76.48 |
| Mg | 2405.34 | 7168.15 | 7301.89 |
| Al | 209.37 | 1564.30 | 558.79 |
| Si | 737.11 | 382.23 | 122.39 |
| P | 11689.58 | 29308.96 | 27730.09 |
| S | 7289.20 | 0.00 | 0.00 |
| Cl | 7288355.64 | 4985551.10 | 4849588.29 |
| K | 831.11 | 139.28 | 56.55 |
| Ca | 33797.69 | 99003.50 | 96239.38 |
| Sc | 0.62 | 0.76 | 0.58 |
| Ti | 66.63 | 212.78 | 240.49 |
| V | 17.67 | 15.50 | 14.65 |
| Cr | 3.30 | 10.22 | 7.70 |
| Mn | 101.83 | 394.19 | 377.85 |
| Fe | 553.79 | 2502.44 | 1882.78 |
| Co | 0.33 | 1.30 | 0.94 |
| Ni | 4.27 | 13.10 | 7.87 |
| Cu | 7.39 | 4.57 | 2.04 |
| Zn | 179.08 | 311.26 | 69.05 |
| Ga | 0.26 | 1.41 | 0.79 |
| Ge | 0.20 | 0.11 | 0.13 |
| As | 28.76 | 73.49 | 93.96 |
| Se | 0.00 | 0.00 | 0.00 |
| Br | 121.21 | 29.00 | 26.13 |
| Rb | 0.72 | 0.43 | 0.13 |
| Sr | 203.85 | 636.02 | 592.22 |
| Y | 2.38 | 6.18 | 6.19 |
| Zr | 0.62 | 2.15 | 2.87 |
| Nb | 0.25 | 0.81 | 0.88 |
| Mo | 0.78 | 17.80 | 3.45 |
| Ru | 0.01 | 0.01 | 0.01 |
| Rh | 0.04 | 0.14 | 0.10 |
| Pd | 0.01 | 0.03 | 0.03 |
| Ag | 0.42 | 1.14 | 0.14 |
| Cd | 0.14 | 0.04 | 0.01 |
| In | 0.01 | 0.01 | 0.00 |
| Sn | 2.44 | 2.25 | 1.79 |
| Sb | 0.03 | 0.20 | 0.13 |
| Te | 0.00 | 0.01 | 0.00 |
| I | 0.44 | 0.03 | 0.01 |
| Cs | 0.01 | 0.01 | 0.00 |
| Ba | 7.02 | 39.85 | 48.67 |
| La | 0.67 | 19.12 | 5.23 |
| Ce | 0.87 | 3.15 | 29.19 |
| Pr | 0.12 | 0.43 | 0.40 |
| Nd | 0.46 | 1.63 | 1.45 |
| Sm | 0.11 | 0.38 | 0.36 |
| Eu | 0.04 | 0.12 | 0.12 |
| Gd | 0.22 | 0.69 | 11.54 |
| Tb | 0.04 | 0.11 | 0.12 |
| Dy | 0.26 | 0.78 | 0.77 |
| Ho | 0.06 | 0.16 | 0.17 |
| Er | 0.16 | 0.46 | 0.47 |
| Tm | 0.02 | 0.07 | 0.07 |
| Yb | 0.14 | 0.40 | 0.52 |
| Lu | 0.02 | 0.06 | 0.07 |
| Hf | 0.01 | 0.04 | 0.05 |
| Ta | 0.01 | 0.00 | 0.00 |
| W | 0.06 | 1.19 | 0.20 |
| Re | 0.00 | 0.00 | 0.00 |
| Os | 0.00 | 0.00 | 0.00 |
| Ir | 0.00 | 0.00 | 0.00 |
| Pt | 0.00 | 0.01 | 0.01 |
| Au | 0.01 | 0.03 | 0.01 |
| Hg | 0.02 | 0.01 | 0.01 |
| Tl | 0.00 | 0.00 | 0.00 |
| Pb | 0.96 | 1.18 | 0.65 |
| Bi | 0.08 | 0.08 | 0.17 |
| Th | 0.50 | 1.71 | 1.66 |
| U | 1.11 | 1.95 | 2.82 |

The elemental analysis shown levels of Mg, Al, Si, P, Cl, K, Ca, Ti, V, Cr, Mn, Fe, Zn, As, Br, Sr, Ba, Ce and Gd are dominant while the other elements are present in traces.

Proof of Concept—Test Set-Up

The proof of concept was done in a laboratory scale batch reactor by using a commercially microwave oven. The reactor was designed to improve the handling and visibility of the sample, to improve the gas analysis capabilities. The sample tube was a quartz tube, placed inside an alumina tube with one closed end inside the oven volume. This alumina tube was penetrating the back wall of the microwave oven (see FIGS. 4A and 4B).

The inner quartz sample tube (see FIG. 4C) was connected to the outer alumina tube with a steel flange. The connections between the flanges and tubes were made gas-tight with the help of Viton O-rings and silicone paste. The sweep gas was entering the outer tube and then being forced into the inner quartz tube through the sample and out, where it was passed through a condensing cold trap and by a mass-spectrometer for the real-time analysis of the gases. A metal sheathed insulated junction K-type thermocouple was placed inside the sample at the start of a test together with a thin metal tube to be able to inject additional gasification agent into the sample as desired. All metallic parts inside and around the inner oven volume were electrically grounded to avoid sparks. The whole setup was placed inside a reflecting metallic cage to avoid microwave radiation leakage.

The test setup (see FIG. 5) is providing the mass flow control over the sweep gas flow, gasification agent flow (water/$CO_2$). The mixture of the produced gas and the sweep gas (argon) passes through a tube into the ventilation. A mass spectrometer (HPR-20 from Hiden Analytical) samples the gas continuously from the exhaust tube, monitoring the real time gas composition.

The sample temperature and the oven temperature are measured by a thin insulated K-type thermocouple. All control and data acquisition is made in LabView software via National Instruments CompactRio I/O modules. The output of the oven magnetron is controlled externally by switching it on and off (full power/zero power) using the sample temperature reading and a relay switch. The maximum output magnetron power is 700 W.

Tests Procedure

Figure 6:
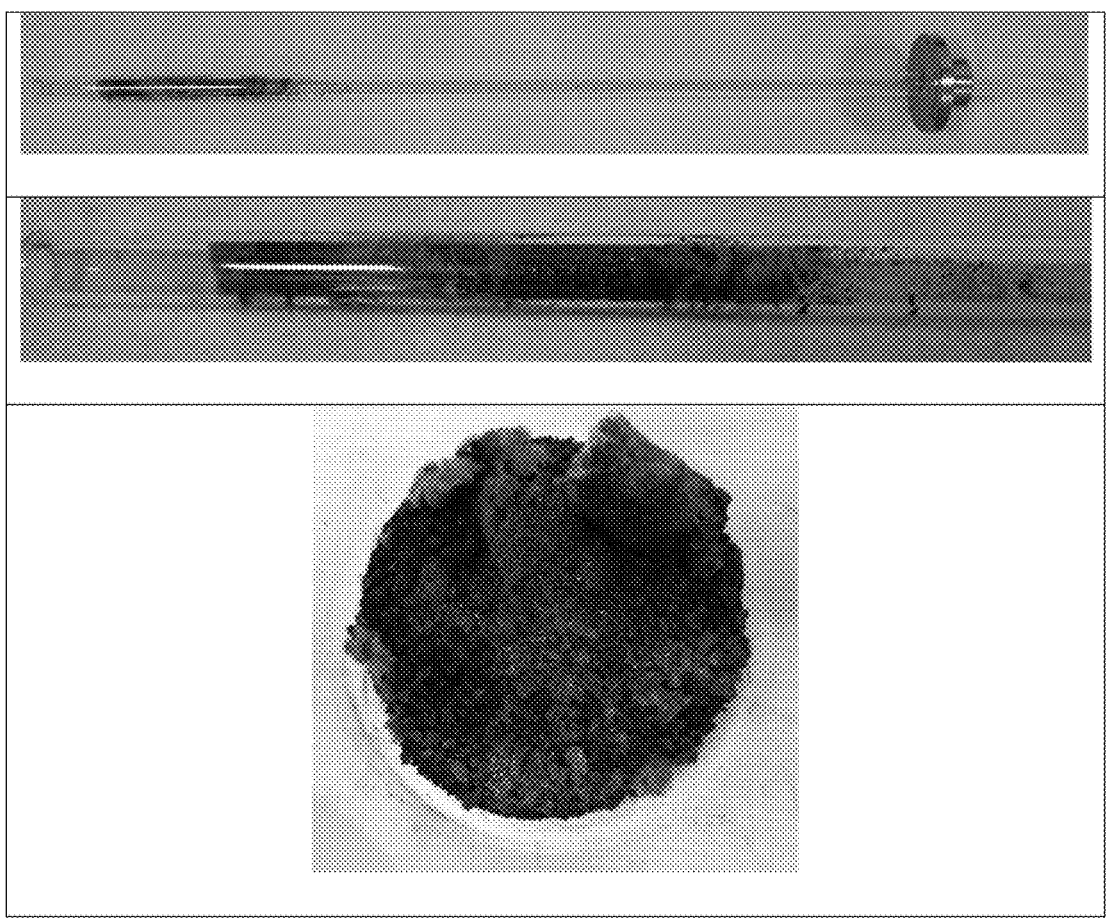
FIG. 6. Fish sludge sample after MW pyrolysis/gasification, and after removal from the quartz tube.

The fish sludge coming from the RAS fish farm is of varying solids content and therefore, we were drying the sludge in air at 104° C. for 12 hours prior to using it in the tests. This removes all the free water, leaving only absorbed or chemically bound water left inside the sample. Water as a gasifying agent can then be added to the sample via the tube and the liquid flow controller. Five grams of dried sludge are weighed and used in each test. The sludge is mixed with 15 grams of microwave absorbing additives (either SiC powder or $LaCrO_3$ crush) and put inside the quartz tube at the end farthest from the flange (see FIG. 6). The thermocouple and the water supply tube are inserted. The sample is fixed in place inside the quartz tube by two gas permeable rockwool plugs, which are also weighed. The sample tube is then placed inside the alumina tube so that the sample is inside the oven, the flange connection is tightened, and sweep gas inlet and product gas outlet are connected.

1 l/m in of sweep gas is used during the testing. The desired sample temperature is set in the software, and the oven starts to heat until the desired temperature set point is reached. The software is then switching the magnetron on and off to keep the measured sample temperature close to the set point. Water is supplied into the sample at a rate of 5-10 g per hour. Partial pressures of Ar, $CH_4$, $H_2$, CO, $CO_2$ and $H_2O$ are recorded by the mass spectrometer every 30 seconds.

After the sample has cooled down, the quartz tube is removed from the setup; the sample with the rockwool plugs is pushed out and weighed. There is often condensate on the tube walls, this condensate is wiped out and weighed too. An approximate mass balance is then calculated based on the weighing results and analysis of the gas composition, which is approximated from the partial pressures of gases and the constant flow rate of the sweep gas.

Test Results

Around 20 tests have been performed on microwave pyrolysis/gasification of the fish sludge. The samples heating was attempted with SiC and with crushed $LaCr_3$ ceramic as the MW absorbing additive, and without other additives. The samples were heated with and without adding gasifying agents (water, $CO_2$). Data from a representative test performed on the 16th of March (sample mixed with SiC additive, water added as gasifying agent) is presented here as an example.

Figure 7:
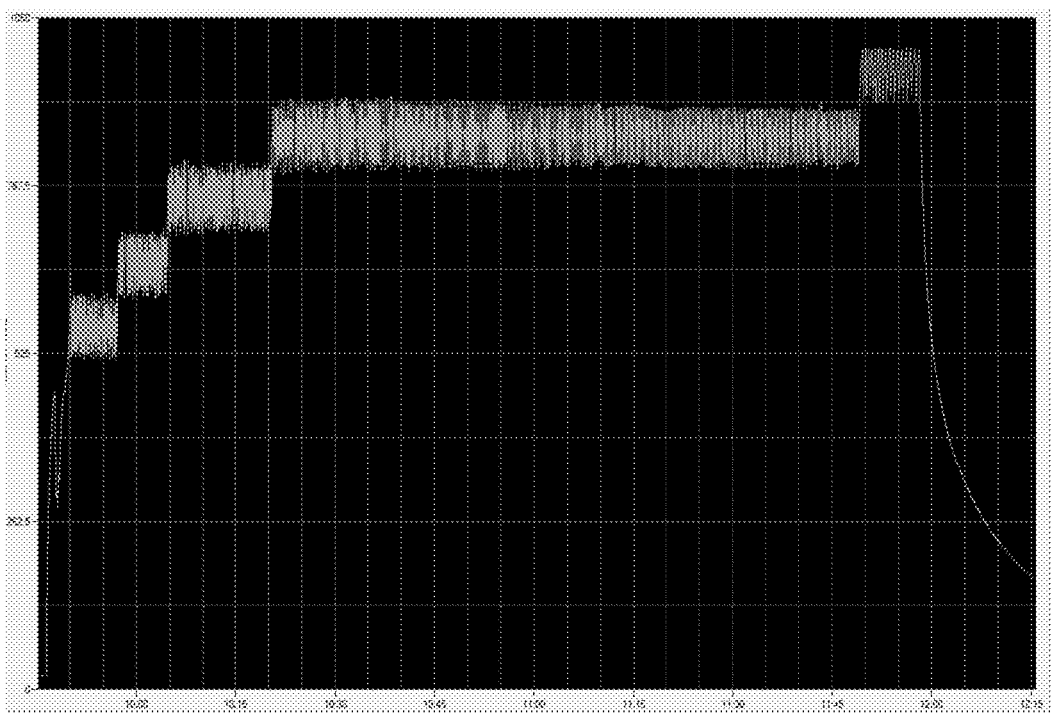
FIG. 7 shows the temperature measured inside the sample during the pyrolysis/gasification test on Mar. 16, 2018.

The total duration of the heating was 2 hours 12 minutes. This is much longer than would be actually required. The reason was to see clearly, at which temperature the gases were being produced, and to be able to estimate the amounts of each produced gas from the mass spectrometer data. The sample was heated stepwise from ambient to 1000° C. as shown in the FIG. 7 below. The reactor heating control is based on switching the magnetron on and off, so the actual average temperature of the sample during the "constant temperature" steps was approximately 30 degrees below the setpoint: 570° C. instead of 600° C., 670° C. instead of 700° C. etc. (see FIG. 7 shows the t). The corresponding gas production (mass spectrometer data) is shown below the temperature profile (see FIGS. 8A, 8B, 8C and 8D).

The graphs above are roughly aligned time wise, so it is possible to see that each step brought some additional gas production, but the largest amount of products were generated at around 600° C. and then at close to 1000° C. The initial pyrolysis and partial gasification reactions start around 140° C. and between 400 and 600° C., and most products are formed then. Further heating yields little until quite high temperature. It is likely that the second large peak at around 1000° C. is the result of the reaction between the produced oils and char and water vapor to produce more gaseous products. The gas analysis produced the following results, see table 2.

TABLE 2

Composition of the gas produced during the pyrolysis/gasification test on 16 Mar. 2018

| | % vol composition of produced dry gas (over whole test duration) |
|---|---|
| $H_2$ | 25% |
| $CH_4$ | 5% |
| CO | 26% |
| $CO_2$ | 44% |

The combustible fraction of the gaseous products consists mainly of hydrogen and carbon monoxide, while carbon dioxide stands for 44% of the total. The sample used in the test is rather small, and it is likely that excess of water was added, leading to increased $CO_2$ production. It is likely that the gas composition would change based on the heating profile, heating duration, water to dry sludge ratio and other reactor parameters.

The following mass balance (see Table 3. Mass balance of the test on Mar. 16, 2018) was produced on the basis of sample weighing.

TABLE 3

Mass balance of the test on 16 Mar. 2018

| IN | | OUT | |
|---|---|---|---|
| Fish sludge dried | 5.03 | Sludge + SiC + plugs | 20 |
| SiC | 15.03 | Pyro oil and water condensate | 0.29 |
| Rockwool plugs | 1.93 | | |
| Sludge converted | 1.99 | | |
| Of which: | | | |
| Liquid products/condensate | 0.29 | | |
| Pyrolysis gas produced | 1.7 | | |
| Char/ash | 3.04 | | |

TABLE 4

Distribution of the products (mass balance)

| | Distribution of products |
|---|---|
| Liquid products/condensate | 12% |
| Gas produced | 54% |
| Char/ash | 34% |

This balance does not include the water that was supplied to the sample, as most of it evaporated and condensed further in the outlet gas tube and the cold trap. Part of that water reacted with the pyrolysis products.

TABLE 5

Mass balance MW sludge sample 16 Mar. 2018

| | In, g | | Out, g | Sum out, minus water and sweep gas, g |
|---|---|---|---|---|
| $H_2$ in, g | 0 | $H_2$ out | 0.06 | |
| $CH_4$ in | 0 | $CH_4$ out | 0.08 | |

TABLE 5-continued

Mass balance MW sludge sample 16 Mar. 2018

|  | In, g |  | Out, g | Sum out, minus water and sweep gas, g |
|---|---|---|---|---|
| CO in | 0 | CO out | 0.80 | |
| $CO_2$ in | 0 | $CO_2$ out | 2.17 | |
| Ar in/out | 55.36 | Ar out | 55.47 | |
| $H_2O$ in | 22.66 | $H_2O$ gas out | 0.22 | |
|  |  | $H_2O$ evaporated from the sample | 2 | |
| Sum | 78.02 |  | 60.81 | 3.11 |

According to this calculation, a total of 3.11 g of gas ($H_2$, $CH_4$, CO and $CO_2$) was produced. This mass includes the water that reacted with the pyrolysis products. Assuming that the sample has lost 1.7 g (initial weight minus the residue minus the condensate/oil collected from the quartz tube walls), and 3.11 g of gas was detected at the outlet, around 1.4 g of water has reacted during the test.

The table 6, below, shows the results for the salted sludge, commercial fish food and 2 samples after the pyrolysis and gasification+microwave. The fish sludge from the RAS unit (with salt) was dried at 104° C. for 12 h prior testing in the microwave reactor (here are given as example 2 sample tests on 16 March and on 22 March, respectively—different conditions).

As evident from the table 6, the HHV and LHV are about 21-23.000 J/g for the food and in the sludge it decreases to 11-12 000 J/g. This means that the fish are eating the food and some energy is absorbed by the fish during digestion. After the pyrolysis and gasification with microwaves the energy values are decreasing to 1300-1500 J/g for one sample and 8-900 J/g for the other one. This simply shows that with the method and reactor according to the disclosure, we have managed to achieve complete gasification and pyrolysis of the sample. This is extraordinary.

In accordance with the disclosed method, the temperature of the processes are preferably around 600° C. If we allow the temperature to increase the salt will start to volatilize, and this will impose problems to the reactor and the efficiency of the method. NaCl has a boiling point at 801 C but it can start to vaporize below this temperature.

The salt vaporization will affect the reactor itself (e.g. corrosion problems, cracking of the steel walls) but also the salt vapors will be present in the produced gas. Thus, we will have to clean the gas to be suitable for the fuel cell system. It would be important to keep the temperature as low as possible to avoid salt vaporization.

The salt is shown in the analysis by Na and Cl−. The sludge that we used is from smolts unit (using a mixture of salt and fresh water). Anyhow, the proposed reactor will work perfectly fine also with higher concentrations of salt in the water, i.e. on waste coming from a sea-based fish farms.

TABLE 6

| Resulted data | U.M. | Sample/Obtained data | | | | Method used for the analyses |
|---|---|---|---|---|---|---|
| | | Dried initial fish waste (sludge) WITH SALT dried at 100° C. for 12 h 294i | fish food 295i | Test10 (16 March 2018) Sludge from RAS unit, dried at 104 C. for 12 H before the microwave testing 298i | Test 19 299i Sludge from RAS unit, dried at 104 C. for 12 H before the microwave testing | |
| High Heating Value (HHV) | 1 | 12 326 | 23 120 | 1511 | 904 | DIN-51900-1: 2000 |
| Low Heating Value (LHV) | | 11 442 | 21 568 | 1373 | 786 | DIN-51900-2: 2003 |
| Sodium (Na) | mg/kg | 36 120 | 4 770 | 8 360 | 9 290 | SR EN ISO 11885: 2009 |
| Phosphor (P) | mg/kg | 34 500 | 14 400 | 5 610 | 8 270 | |
| As | mg/kg | 1.60 | 1.22 | 0.18 | 0.28 | SR ISO 11466: 1999 |
| Cd | mg/kg | 0.52 | 0.30 | 0.25 | 0.26 | SR EN ISO 17294-2:2017 |
| Cr | mg/kg | 4.77 | 2.95 | 15.82 | 37.82 | |
| Co | mg/kg | 0.97 | 0.45 | 0.91 | 3.02 | |
| Cu | mg/kg | 7.95 | 2.93 | 2.26 | 7.16 | |
| Mn | mg/kg | 142 | 21.96 | 78.25 | 135 | |
| Ni | mg/kg | 8.24 | 4.11 | 21.29 | 164 | |
| Pb | mg/kg | 1.57 | 0.75 | 1.03 | 1.48 | |

TABLE 6-continued

| Resulted data | U.M. | Dried initial fish waste (sludge) WITH SALT dried at 100° C. for 12 h 294i | fish food 295i | Test10 (16 March 2018) Sludge from RAS unit, dried at 104 C. for 12 H before the microwave testing 298i | Test 19 299i Sludge from RAS unit, dried at 104 C. for 12 H before the microwave testing | Method used for the analyses |
|---|---|---|---|---|---|---|
| Zn | mg/kg | 267 | 70.82 | 33.10 | 24.84 | |
| Carbon | % | 27.4 | 47.9 | 26.7 | 20.2 | ISO 10694:1995 |
| Hydrogen | % | 4.41 | 7.16 | 0.354 | 0.252 | |
| Oxygen | % | 22 | 27.3 | 7 | 5.46 | ISO 13878:1998 |
| Sulphur (S) | % | SLQ(<0.01) | SLQ(<0.01) | SLQ(<0.01) | SLQ(<0.01) | ISO 15178:2000 |
| Nitrogen (N) | % | 2.52 | 7.75 | 1.42 | SLQ(<0.01) | |
| Fluoride ($F^-$) | mg/kg | 840 | 710 | 84.5 | 4.5 | SR EN ISO 10304-1:2009 |
| Chloride ($Cl^-$) | mg/kg | 99 000 | 12 110 | 21 270 | 13 500 | |
| Nitrite ($NO_2^-$) | mg/kg | <0.5 | <0.5 | <0.5 | <0.5 | |
| Nitrate ($NO_3^-$) | mg/kg | 53.5 | 54.5 | 10.6 | 11.0 | |
| Phosphate ($PO_4^{3-}$) | mg/kg | <0.5 | 15 562 | 10.0 | <0.5 | |
| Sulphate ($SO_4^{2-}$) | mg/kg | 9 865 | 1 700 | 1 200 | 82.5 | |

SLQ = Under detection limit of the method
Sample 294i: fish waste WITH SALT
Sample 295i: fish food
Sample 298i: Test 10 (16 March 2018 pyro/gas - microwaves)
Sample 299i: Test no. 19 (pyro/gas - microwaves)

The invention claimed is:

1. A method for continuous large scale converting an aqueous salt containing sludge from a marine fish farm into gases and a solid residue, comprising the steps of:
   dewatering the aqueous salt containing sludge to a water content of 20-60% (weight/weight);
   heating the dewatered sludge to a temperature of 500° C. to 700° C. by microwave radiation, thereby generating heat and steam;
   partially or completely pyrolyzing the heated dewatered sludge to produce pyrolysis products, wherein the pyrolysis products comprise CO gas, $CH_4$ gas and $H_2$ gas, CHO oil and solid C;
   gasifying the pyrolysis products, wherein the solid C, $H_2$ gas and CHO oil are gasified to CO gas and $H_2$ gas, wherein
   the steps of pyrolysis and gasification takes place simultaneously in one reactor, and
   the microwave radiation generates the steam for the gasification reaction by heating the water in the salt containing aqueous sludge.

2. The method according to claim 1, wherein the anoxically exposure in the reaction is obtained by adding an inert gas to the reactor.

3. The method according to claim 1, wherein the temperature of 500° C. to 700° C. is maintained without external cooling of the reactor.

4. The method according to claim 1, wherein a microwave radiation absorber (catalyst) is used to absorb microwave radiation.

5. The method according to claim 4, wherein the microwave radiation absorber is produced during the pyrolysis of the sludge.

6. The method of claim 5, wherein the microwave radiation absorber is carbon produced during the pyrolysis of the sludge.

7. The method according to claim 1, wherein a microwave radiation absorber (catalyst) is used to absorb microwave radiation.

8. The method according to claim 1, wherein the salt containing dewatered sludge is continuously fed to the reactor, and wherein a microwave radiation having a field density of 0.5-5 kW/liter is applied to the sludge, and wherein the dewatered sludge is anoxically exposed to a temperature in the range of 500° C. to 600° C.

9. The method according to claim 8, wherein the microwave radiation has a field density of 0.8-2 kW/liter.

10. The method according to claim 1, wherein the salt containing aqueous sludge contains salt in a concentration within an approximate range of 10-100 g/kg.

11. The method according to claim 10, wherein the salt containing aqueous sludge contains salt in a concentration within an approximate range of 30-40 g/kg.

12. The method according to claim 1, wherein the reactor has increasing temperature through the reactor, in order to produce gas with a low vapor pressure of salt at low temperatures and produce remaining gas at higher temperature and at low gas volume to obtain complete conversion.

13. The method according to claim 1, wherein steam in a first part of the reactor can bypass a pyrolysis zone and be directed to a gasification zone in order to control reaction products.

14. The method according to claim 1, further comprising directing steam produced in the dewatering step to the reactor.

15. The method according to claim 1, further comprising condensing out salt in a condensation chamber.

16. A method for converting aqueous salt containing sludge generated by sea-based fish farming or recirculating aquaculture systems (RAS) into gases and char using microwave radiation, the method comprising:

feeding, to a reactor, the aqueous salt containing sludge having a water content of 20-60% (weight/weight); and subjecting, in the reactor, said sludge to heating at a temperature of 500° C. to 700° C. by microwave radiation, thereby generating heat and steam, wherein during the subjecting, the following occurs simultaneously:

said sludge is partially or completely pyrolyzed in said reactor to produce pyrolysis products, wherein the pyrolysis products comprise CO gas, $CH_4$ gas, $H_2$ gas, CHO oil and solid C; and said pyrolysis products are gasified with the steam in said reactor to produce CO gas and $H_2$ gas, said steam resulting from microwave radiation heating of the water contained in said sludge.

\* \* \* \* \*